MEANS FOR COMPARING DIGITAL VALUES

Filed Dec. 23, 1963 3 Sheets-Sheet 1

SERIAL SCAN

INVENTORS
RICHARD S. CARTER
WALTER W. WELZ

BY Melvin P. Williams
ATTORNEY

Nov. 29, 1966 R. S. CARTER ET AL 3,289,160

MEANS FOR COMPARING DIGITAL VALUES

Filed Dec. 23, 1963 3 Sheets-Sheet 2

Nov. 29, 1966 R. S. CARTER ETAL 3,289,160

MEANS FOR COMPARING DIGITAL VALUES

Filed Dec. 23, 1963 3 Sheets-Sheet 3

3,289,160
Patented Nov. 29, 1966

3,289,160
MEANS FOR COMPARING DIGITAL VALUES

Richard S. Carter and Walter W. Welz, Poughkeepsie, N.Y., assignors to International Business Machines Corporation, New York, N.Y., a corporation of New York Filed Dec. 23, 1963, Ser. No. 332,727
3 Claims. (Cl. 340—146.2)

This invention relates to data processing, and more particularly to a means for comparing digital values therein.

In the data processing art, it has long been recognized that there is a need to ascertain the relationship which obtains between different values. Examples are numerous and, for illustration, may include transmitting a particular value two successive times and comparing the received results, said results being accurate only if the two received results are identical; comparing a search argument against a table; or, as will be utilized in an exemplary embodiment herein, to determine when two addresses bear a fixed relationship to one another.

The art is replete with comparing circuits, which include simple types that can determine only whether or not there is equality, and more complex types which can also determine whether one input is higher or lower than another. It is the simple type to which this particular invention relates.

According to the teachings of the prior art, in order to compare two values, two different sources must be fed into two different inputs of a value comparison device. Therefore there must be two different buses upon which the values can proceed from respective sources to related inputs; otherwise, these values must be multiplexed on a common bus, first one and then the other in series. Thus, in addition to the sources containing the information required, it is necessary to provide a comparing circuit and sufficient bus means for causing the comparing circuit to respond to the two individual sources. If multiplexing is used, the operation is, of course, slowed down. Further, prior comparing devices can only test two numbers at one time.

A primary object of the present invention is to provide simplified comparing of a pair of digital values. Other objects include the following:

- provision of a device for determining whether or not a fixed relationship between two numbers exists at a minimum cost;
- provision of a device capable of testing more than two values for identity without complex circuitry;
- provision of such a comparing means with a minimum of circuitry;
- provision of such a comparing means which requires only a single, non-multiplexed bus;
- provision of such a comparing means capable of operating at highest logic speed.

This invention is predicated on the concept that a data processing system necessarily includes validity checking circuitry.

In accordance with the present invention, a plurality of values which are to be compared are simultaneously gated into the same validity checker, thereby causing the validity checker to respond to the code bits of any of said values, and a lack of an error output signal from the validity checker (which is normally used to check for valid data) is indicative of equal values. This invention eliminates the need for special comparing circuitry, permits using a single bus in order to compare at least two values, and permits the comparison of at least a pair of numbers in a timing relationship which is fully compatible with the utilization of the circuitry involved within the data processing system. This invention also permits comparing, for total equality, any number of data sources.

The foregoing and other objects, features and advantages of the invention will be apparent from the following more particular description of a preferred embodiment thereof, as illustrated in the accompanying drawings.

Figure 2:
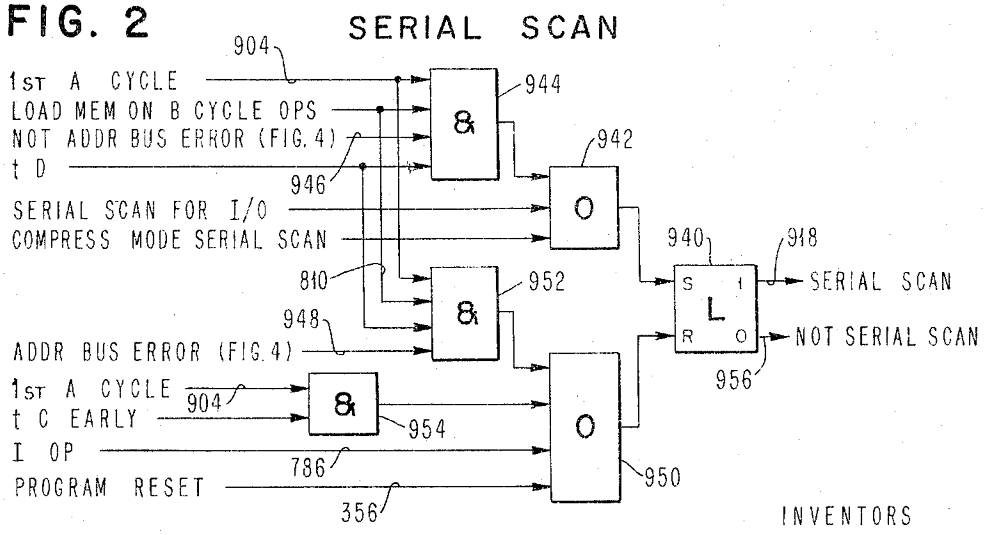
FIG. 2 is a schematic block diagram of a SERIAL SCAN circuit which is responsive to a NO ERROR signal generated by the embodiment of FIG. 1.
Figure 3:
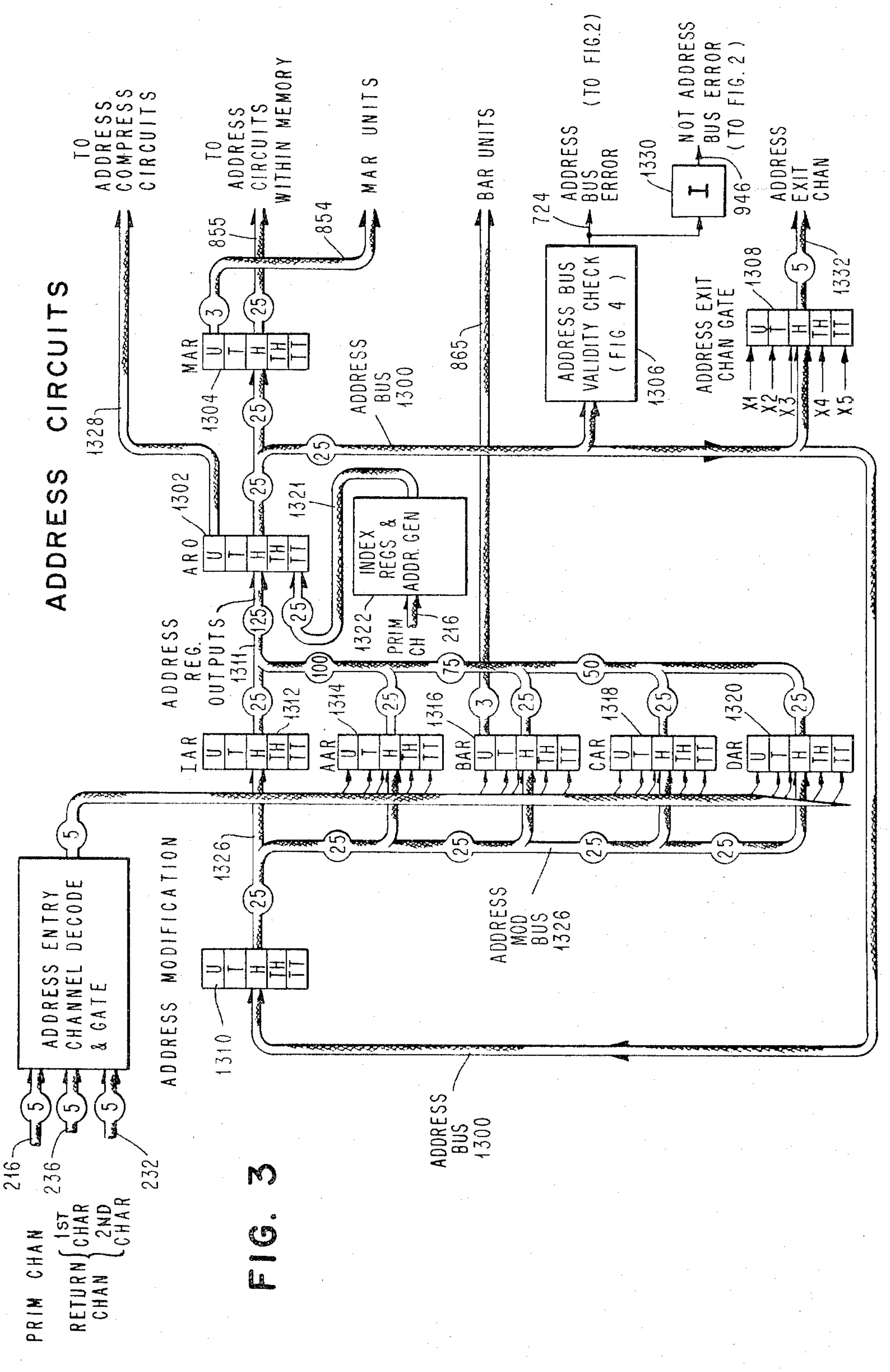
FIG. 3 is a schematic block diagram of ADDRESS CIRCUITS within which the present invention may be embodied.
Figure 4:
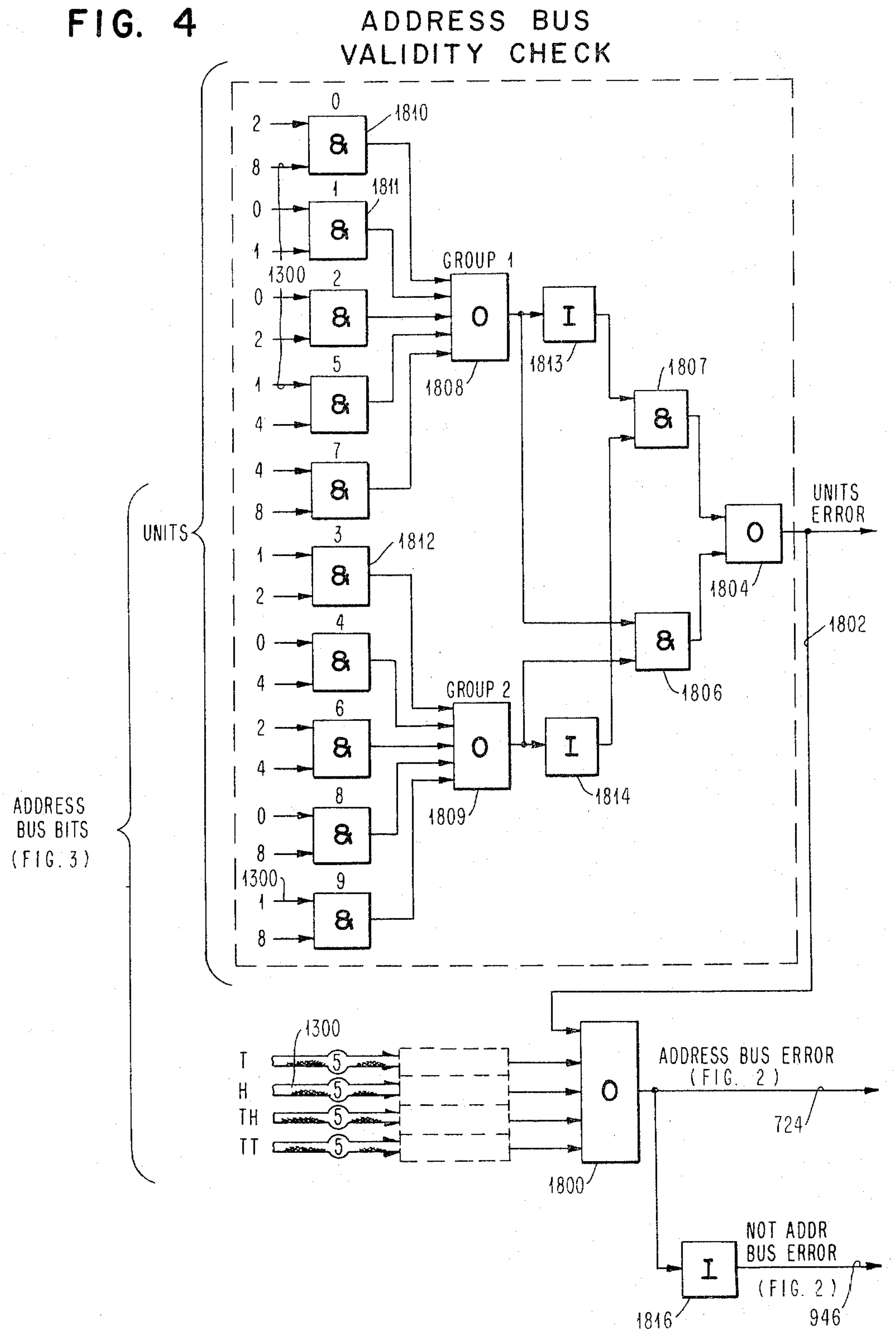
FIG. 4 is a schematic block diagram of an ADDRESS BUS VALIDITY CHECK circuit which is illustrative of one form of BUS VALIDITY CHECKER as shown in FIG. 1.

An exemplary embodiment of the subject invention is fully disclosed in a co-pending application of the same inventors, assigned to the same assignee which was filed in the Patent Office on even date herewith entitled, "Parallel Memory, Multiple Processing, Variable Word Length Computer," Serial No. 332,648 filed December 23, 1963. FIGS. 2–4 of this application are virtually identical with FIGS. 56, 80, and 115, respectively, in said co-pending application. Insofar as applicable, the reference numerals are the same in both cases. Thus, the details of a computing system within which the present invention may be embodied are fully disclosed in said co-pending application, and further details as to the exemplary embodiment shown herein may be derived therefrom.

Figure 1:
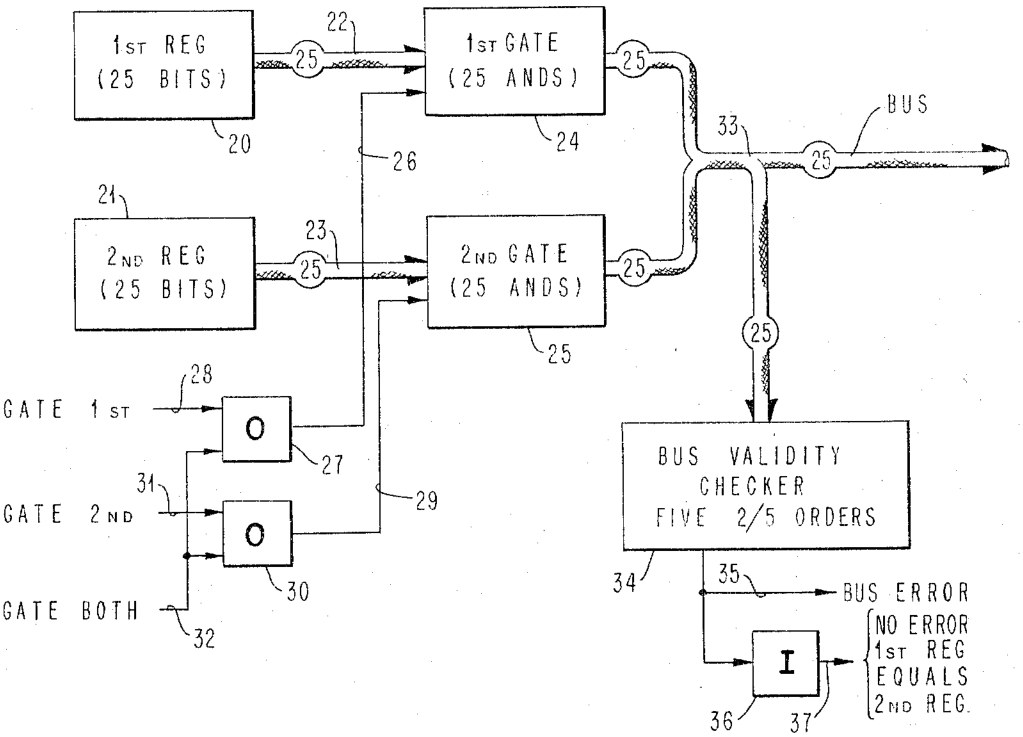
FIG. 1 is a schematic block diagram of a simplified circuit embodying the present invention.

In FIG. 1, a pair of registers 20, 21, each may contain twenty-five bits of information which are supplied over corresponding twenty-five bit buses 22, 23 to a related GATE 24, 25. Only two registers are shown for simplicity, but it will be apparent from the following description that any number of registers may be compared for identity in the same fashion. The 1st GATE 24 is operated by a signal on a line 26 in response to an OR circuit 27 and a GATE 1st signal on a line 28; the 2nd GATE 25 is operative in response to a signal on a line 29 which is generated by an OR circuit 30 in response to a GATE 2nd signal on a line 31. Each of the OR circuits 27, 30 may also respond to a GATE BOTH signal on a line 32. The output of each GATE 24, 25 is connected to a single twenty-five bit BUS 33, which BUS may supply information to other circuits in the computer, and which is also connected to a BUS VALIDITY CHECKER 34. The BUS VALIDITY CHECKER will generate a BUS ERROR signal on a line 35, and by means of an inverter 36 will otherwise generate a NO ERROR signal on a line 37, which NO ERROR signal indicates that the first register contents equal the second register contents.

This circuit is exemplary and shows the basic invention herein, the disclosure of which, in said co-pending application, is somewhat dispersed among the various sections thereof.

Referring briefly to FIG. 3, exemplary ADDRESS CIRCUITS are shown to illustrate the environment within which one embodiment of this invention may be found. The circuit shown in FIG. 3 is essentially the same as that of FIG. 80, and described in Section 19, of said co-pending application. For the purposes of the present invention, it suffices to note that there is an ADDRESS BUS 1300 upon which information in any one of the registers IAR, AAR . . . DAR, or the INDEX REGISTERS, ADDRESS GENERATOR 1322 may be transferred through an ADDRESS MODIFICATION circuit 1310 and onto an ADDRESS MODIFIER BUS 1326 to be placed in any of said registers. The ADDRESS BUS 1300 also may provide information to the main portion of a computer through the ADDRESS EXIT CHANNEL GATE 1308.

The ADDRESS BUS VALIDITY CHECK circuit 1306 (FIG. 3), which is one example of a BUS VALIDITY CHECKER 34 (FIG. 1 herein), continuously monitors the condition of the ADDRESS BUS 1300 and generates an ADDRESS BUS ERROR signal on a line 724 whenever there is other than a single valid character (comprising a coded manifestation in the two-out-of-five code). The ADDRESS BUS ERROR on line 724 is fed to an inverter 1330 to generate a NOT ADDRESS BUS ERROR signal on line 946. The NOT ADDRESS BUS ERROR signal on line 946. The NOT ADDRESS BUS ERROR SIGNAL on line 946 is equivalent to an indication that any two sets of data which may be applied to the ADDRESS BUS 1300 at one time are equal.

In said co-pending application, the specific use of the ADDRESS BUS VALIDITY CHECK circuit 1306, as a comparing means, is to compare the contents of the AAR 1314 with the contents of the BAR 1316 by gating both of them through ARO 1302 onto the ADDRESS BUS 1300 at the same time. In said co-pending application, the manifestation of the equality between the contents of the AAR 1314 and the BAR 1316 is used to show that that A address and the B address are now equal, and since the A address is first incremented by one unit before the comparison takes place, the present equality of the two addresses designates the fact that the original addresses are one increment apart. This defines a SERIAL SCAN operation in said co-pending application, the utilization of this signal to create a SERIAL SCAN signal on a line 918 is illustrated herein in FIG. 2.

In the present embodiment, the details of the SERIAL SCAN operation are not significant, it suffices herein to note that the NOT ADDRESS BUS ERROR signal on line 946 is applied to an AND circuit 944 (FIG. 2) so as to cause an OR circuit 942 to set a latch 940; when the latch is set, the data processing system will handle only one character at a time due to the presence of the SERIAL SCAN signal on line 918. Unless there is a NOT ADDRESS BUS ERROR signal on line 946 (or one of the other illustrative inputs to an OR circuit 942), a SERIAL SCAN operation will not result. It should be obvious to those skilled in the art, that other utilizations of the comparing means appear throughout any data processing system, the present example of an address comparison, to control a SERIAL SCAN operation, is illustrative only, and the present invention is more commensurate with the circuit of FIG. 1.

The ADDRESS BUS VALIDITY CHECK circuit 1306 (FIG. 3) which is used to test the validity of all two-out-of-five characters on the ADDRESS BUS 1300, and additionally used as an address comparing means, is shown in FIG. 4. In FIG. 4, the ADDRESS BUS ERROR signal on line 724 is generated by an OR circuit 1800 in response to any one of a plurality of error signals corresponding to the various five characters on the ADDRESS BUS 1300. By way of example, a complete validity checker for the UNITS position of the ADDRESS BUS is shown in the upper portion of FIG. 4. There, a UNITS ERROR signal is generated on a line 1802 in response to an OR circuit 1804, which in turn responds to either of two AND circuits 1806, 1807. The AND circuit 1806 will be operative if there are signals from a GROUP 1 OR circuit 1808 and from a GROUP 2 OR circuit 1809 simultaneously. The OR circuit 1808 senses various combinations of the two-out-of-five code, which combinations are included in GROUP 1; the OR circuit 1809 senses the remaining combinations of the two-out-of-five code; this being considered GROUP 2. The two-out-of-five code is such that if there is one character in GROUP 1, there cannot be another character in GROUP 2 at the same time. This is so because it requires more than two bits to specify two different characters and a 2 bit character is all that will be recognized as valid. For instance: an AND circuit 1810 senses decimal 0 by responding to the 2 bit and the 8 bit; an AND circuit 1811 senses decimal 1 by recognizing a 0 bit and a 1 bit; and an AND circuit 1812 senses decimal 3 by the concurrence of a 1 bit and a 2 bit. It would be impossible, in accordance with the definition of the two-out-of-five code to have two of these characters on the bus at once, for instance, in order to have a decimal 1 and a decimal 3, it would be necessary to have the 0 and 1 and the 1 and 2 bits (totalling 0, 1, and 2 bits) on the channel at one time. This, of course would cause both AND circuits 1811 and 1812 to generate signals which the corresponding OR circuits 1808, 1809 would pass to the AND circuit 1806 thereby causing the OR circuit 1804 to generate the UNITS ERROR signal on line 1802.

GROUP 1 and GROUP 2 are chosen in such a fashion that any time a *pair* of characters are generated in one of the groups, this will *automatically* cause a character to be generated in the other group. For instance, assume that a decimal one and a decimal two are generated in GROUP 1. This will be in response to the two-out-of-five code bits 0, 1, and 0, 2. Thus, there will be generated a decimal three value in GROUP 2 as a result of both the 1 bit and the 2 bit of the two-out-of-five code being available to the uppermost AND circuit of GROUP 2. Similarly, inspection will show that any pair of characters in one group will result in an invalid character being generated in the other group; therefore, it is impossible to have more than one correct character generated without having a response from both GROUP 1 and GROUP 2.

The AND circuit 1807 responds to a pair of inverters 1813, 1814 which account for the situation where there is no character in *either* group. If both inverters 1813, 1814 have an output, this means that there is no character in GROUP 1 and no character in GROUP 2. Having no characters whatsoever is invalid, it being required that there be 2 bits at all times (for instance the decimal 0 value is specified by the 2 bit and the 8 bit). Thus the inverters 1813, 1814 will recognize the case where there is *nothing* on the ADDRESS BUS by sending signals to an AND circuit 1807 which will cause the OR circuit 1804 to generate the UNITS ERROR signal on line 1802. The output of the OR circuit 1800 (which comprises the ADDRESS BUS ERROR signal on line 724) is also fed to an inverter 1816 (which is the same as the inverter 36 in FIG. 1, and the inverter 1330 in FIG. 3) that will generate the NOT ADDRESS BUS ERROR signal on line 946 (unless there is an error signal on line 724). This NOT ADDRESS BUS ERROR signal (946) is the same as "A address equals B address" when the validity check circuit is used to compare the A and B addresses hereinbefore.

Although shown only with respect to two sources of data, the invention herein is well suited to comparing a larger number of sources, due to the fact that if all are equal, all will deliver the same bits (two of the five possible bits in this embodiment), and this will result in a single valid character to be sensed as such by the checking means. Also, only one bus (if any) is necessary to connect the sources to the checking means.

The two-out-of-five code was used as an example only, and any code (together with appropriate check circuits) may be used so long as the check guarantees identity.

What is claimed is:

1. In a data processing system, a comparing means comprising:

a validity checking circuit;

a data bus, said data bus being connected to said bus validity checking circuit, said bus validity checking circuit being operative to generate an error signal or a no-error signal in dependence upon the validity of said data on said bus;

first and second data sources, each of said data sources containing data which data is to be compared;

first and second gates, one for each of said sources, each of said gates being selectively operable to connect the corresponding source to said bus;

and first and second gate control means, one for each of said gates, each operative to cause the corresponding gate to connect the related source to said bus, said first and second gate control means being simultaneously operable;

whereby the contents of both of said sources may be applied to said bus simultaneously, and the presence of a no-error signal will indicate that said contents are equal to one another.

2. In a data processing system employing an error checking code, a comparing means comprising:

a plurality of data sources, each of said data sources containing data in the code which is to be compared;

a validity checking circuit having an input with the number of lines equal to the number of bits in the code, said validity checking circuit being operative to generate an error signal in dependence upon the invalidity of said data applied thereto;

and gating means operable to connect at least two of said data sources to said validity checking circuit simultaneously;

whereby the contents of more than one of said sources may be applied to said checking circuit at one time, and the absence of said error signal at said one time will indicate that said contents are equal to one another.

3. The device described in claim 2 wherein said data sources comprise address registers and said gating means includes an address bus to which said validity checking circuit is connected, said validity checking circuit thereby comparing addresses which are applied to said validity checking circuit by said gating means.

References Cited by the Examiner

UNITED STATES PATENTS

| | | | |
|---|---|---|---|
| 3,085,230 | 4/1963 | Shoultes et al. | 340—172.5 |
| 3,204,221 | 8/1965 | Sierra | 340—146.2 |

MALCOM A. MORRISON, *Primary Examiner.*

K. F. MILDE, *Assistant Examiner.*